(12) United States Patent
Goyal et al.

(10) Patent No.: US 12,335,051 B2
(45) Date of Patent: Jun. 17, 2025

(54) AUTOMATED LOCATION VISIT SCHEDULE OPTIMIZATION

(71) Applicant: MARA Labs, Inc., Bengaluru (IN)

(72) Inventors: Abhishek Goyal, Rajasthan (IN); Niraj Kumar, Jharkhand (IN); Ashvin Kumar, Karnataka (IN); Kewal Krishna, Karnataka (IN)

(73) Assignee: MARA Labs, Inc., Bengaluru (IN)

( * ) Notice: Subject to any disclaimer, the term of this patent is extended or adjusted under 35 U.S.C. 154(b) by 470 days.

(21) Appl. No.: 17/930,080

(22) Filed: Sep. 7, 2022

(65) Prior Publication Data

US 2024/0031080 A1   Jan. 25, 2024

(30) Foreign Application Priority Data

Jul. 21, 2022   (IN) .............................. 202241041734

(51) Int. Cl.
  *H04W 84/12*   (2009.01)
  *H04L 1/1829*   (2023.01)
  *H04L 49/00*   (2022.01)

(52) U.S. Cl.
  CPC ........ *H04L 1/1854* (2013.01); *H04L 49/3009* (2013.01); *H04W 84/12* (2013.01)

(58) Field of Classification Search
  CPC ....... H04L 12/28; H04L 12/50; H04L 1/1854; H04L 49/3009; H04W 84/12
  USPC ......................................... 370/329, 401, 402
  See application file for complete search history.

(56) References Cited

U.S. PATENT DOCUMENTS

| | | |
|---|---|---|
| 2010/0088146 A1 | 4/2010 | Zhong et al. |
| 2015/0039663 A1 | 2/2015 | Chiang et al. |
| 2015/0269617 A1 | 9/2015 | Mikurak |
| 2016/0077833 A1 | 3/2016 | Galati et al. |
| 2017/0323250 A1 | 11/2017 | Lindbo et al. |
| 2019/0056233 A1 | 2/2019 | Liu et al. |
| 2023/0379921 A1* | 11/2023 | Awoniyi-Oteri ............. H04W 72/1268 |

OTHER PUBLICATIONS

Koutsokosta et al. A Dynamic Multi-Period, Mixed-Integer Linear Programming Model for Cost Minimization of a Three-Echelon, Multi-Site and Multi-Product Construction Supply Chain, Logistics 2020, 35 pgs. Jun. 21, 2020.

Konstantakopoulos et al., "Vehicle Routing Problem and Related Algorithms for Logistics Distribution: a Literature Review and Classification", Operational Research, 30 pgs. Sep. 9, 2020.

Saha et al. "A Mixed Integer Linear Programming Model for Solving Closed Loop Supply Chain Problems" Journal of Modern Science and Technology vol. 5. No. 1., 11 pgs., Sep. 2017.

* cited by examiner

*Primary Examiner* — Dang T Ton
(74) *Attorney, Agent, or Firm* — The Webb Law Firm

(57) ABSTRACT

A schedule data structure includes a schedule of visits to a plurality of destinations over a plurality of weeks, the visits being associated with respective rider/vehicle identification (RVID) parameters corresponding to one of the plurality of riders/vehicles. The schedule may be optimized for multiple parameters but non-optimized for mirroring. The schedule data structure may be broken into a first part and a second part. A permutation of the first part may be determined and appended with the second part. A mirroring-improved schedule data structure may be determined in response to iterated permutation and appending.

21 Claims, 10 Drawing Sheets

400

| W | S | M | T | W | R | F | S |
|---|---|---|---|---|---|---|---|
| 1 | L = 3<br>R/V = c | L = 1<br>R/V = a | L = 2<br>R/V = b | L = 3<br>R/V = c | L = 1<br>R/V = a | L = 3<br>R/V = c | L = 4<br>R/V = d |
| 2 | L = 4<br>R/V = d | L = 3<br>R/V = c | L = 1<br>R/V = d | L = 2<br>R/V = c<br>L = 3<br>R/V = c | L = 1<br>R/V = a | | L = 3<br>R/V = c |
| ... | ... | ... | ... | ... | ... | ... | ... |

410

| W | S | M | T | W | R | F | S |
|---|---|---|---|---|---|---|---|
| 1 | | | | | | | L = 4<br>R/V = d |
| 2 | L = 4<br>R/V = d | | L = 1<br>R/V = d | | | | |
| ... | ... | ... | ... | ... | ... | ... | ... |

&

420

| W | S | M | T | W | R | F | S |
|---|---|---|---|---|---|---|---|
| 1 | L = 3<br>R/V = c | L = 1<br>R/V = a | L = 2<br>R/V = b | L = 3<br>R/V = c | L = 1<br>R/V = a | L = 3<br>R/V = c | |
| 2 | | L = 3<br>R/V = c | | L = 2<br>R/V = c<br>L = 3<br>R/V = c | L = 1<br>R/V = a | | L = 3<br>R/V = c |
| ... | ... | ... | ... | ... | ... | ... | ... |

Fig. 4

| 510' | W | S | M | T | W | R | F | S |
|---|---|---|---|---|---|---|---|---|
| | 1 | | | L = 2<br>R/V = b | | | | |
| | 2 | | | L = 2<br>R/V = b | | | | |
| | ... | ... | ... | ... | ... | ... | ... | ... |

| 520 | W | S | M | T | W | R | F | S |
|---|---|---|---|---|---|---|---|---|
| | 1 | L = 3<br>R/V = c | L = 1<br>R/V = a | | L = 3<br>R/V = c | L = 1<br>R/V = a | L = 3<br>R/V = c | L = 4<br>R/V = d |
| | 2 | L = 4<br>R/V = d | L = 3<br>R/V = c<br>L = 1<br>R/V = a | | L = 3<br>R/V = c | L = 1<br>R/V = a | | L = 3<br>R/V = c |
| | ... | ... | ... | ... | ... | ... | ... | ... |

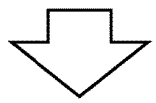

| 600 | W | S | M | T | W | R | F | S |
|---|---|---|---|---|---|---|---|---|
| | 1 | L = 3<br>R/V = c | L = 1<br>R/V = a | L = 2<br>R/V = b | L = 3<br>R/V = c | L = 1<br>R/V = a | L = 3<br>R/V = c | L = 4<br>R/V = d |
| | 2 | L = 4<br>R/V = d | L = 3<br>R/V = c<br>L = 1<br>R/V = a | L = 2<br>R/V = b | L = 3<br>R/V = c | L = 1<br>R/V = a | | L = 3<br>R/V = c |
| | ... | ... | ... | ... | ... | ... | ... | ... |

Fig. 9

AUTOMATED LOCATION VISIT SCHEDULE OPTIMIZATION

CROSS-REFERENCE TO RELATED APPLICATIONS

The present application claims priority to and the benefit of Indian Patent Application No. 202241041734, filed Jul. 21, 2022, the disclosure of which is hereby incorporated by reference.

TECHNICAL FIELD

The present application relates to automated location visit schedule optimization and to computer-based solutions of rider-location visit optimization problems as well as to apparatuses, methods, systems, and techniques pertaining thereto.

BACKGROUND

Optimization of location visits by traveling resources (referred to generally as riders) is a longstanding technical problem. Rider-visit optimization problems arise in a number of contexts including, for example, customer location visits by sales personnel, equipment and facility location visits by maintenance and service personnel, and collection and delivery location visits by fulfillment personnel, among other use cases. A number of proposals have been made for computer-based optimization of rider-visit problems. Such proposals suffer from technical problems arising from computational complexity and attendant computing time and resource burdens imposed by such complexity. Rider-visit optimization problems may be framed by a number of competing constraints or objectives. The inventors have realized that computational complexity required for solving such constraints scales non-linearly in a number of situations. For example, the combinations that need to be considered and compared for optimized solutions of some multi-day, multi-week, multi-rider, multi-location rider-visit problems scale factorially with the number days (d) in the solution space and exponentially with the number of riders (n) in a solution space (e.g., $d!^n \approx 1.06 \times 10^{37}$ for 10 riders and 7 days, $1.12 \times 10^{74}$ for 20 riders and 7 days, $1.25 \times 10^{148}$ for 40 riders and 7 days, and $1.25 \times 10^{296}$ for 80 riders and 7 days). Thus, the computing time and resource burdens required for an optimized solution become cost prohibitive in terms of required computing time and resources and may reach the point of impracticability or unsolvability as the problem space scales. The technical fundamentals of this problem space have left a substantial unmet need for practical, real-world solutions to computer-based solutions of rider-visit visit optimization problems that can be performed sufficiently quickly with practically or technically limited computing resources. The present disclosure overcomes the foregoing and other shortcomings and problems in the art with a number of unique apparatuses, methods, systems, and techniques of computer-based solutions of rider-visit optimization problems.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Some example embodiments include unique computer-based methods of solving rider-visit optimization problems. Some example embodiments include unique computer systems configured to solve rider-visit optimization problems. Some example embodiments include apparatuses implementing computer-based solutions for rider-visit optimization problems. Further embodiments, forms, objects, features, advantages, aspects, and benefits shall become apparent from the following description and drawings.

BRIEF DESCRIPTION OF THE DRAWINGS

FIGS. 4-9 are schematic illustrations depicting certain aspects of example schedule data structures and the processing thereof.

DETAILED DESCRIPTION OF EXAMPLE EMBODIMENTS

Figure 1:
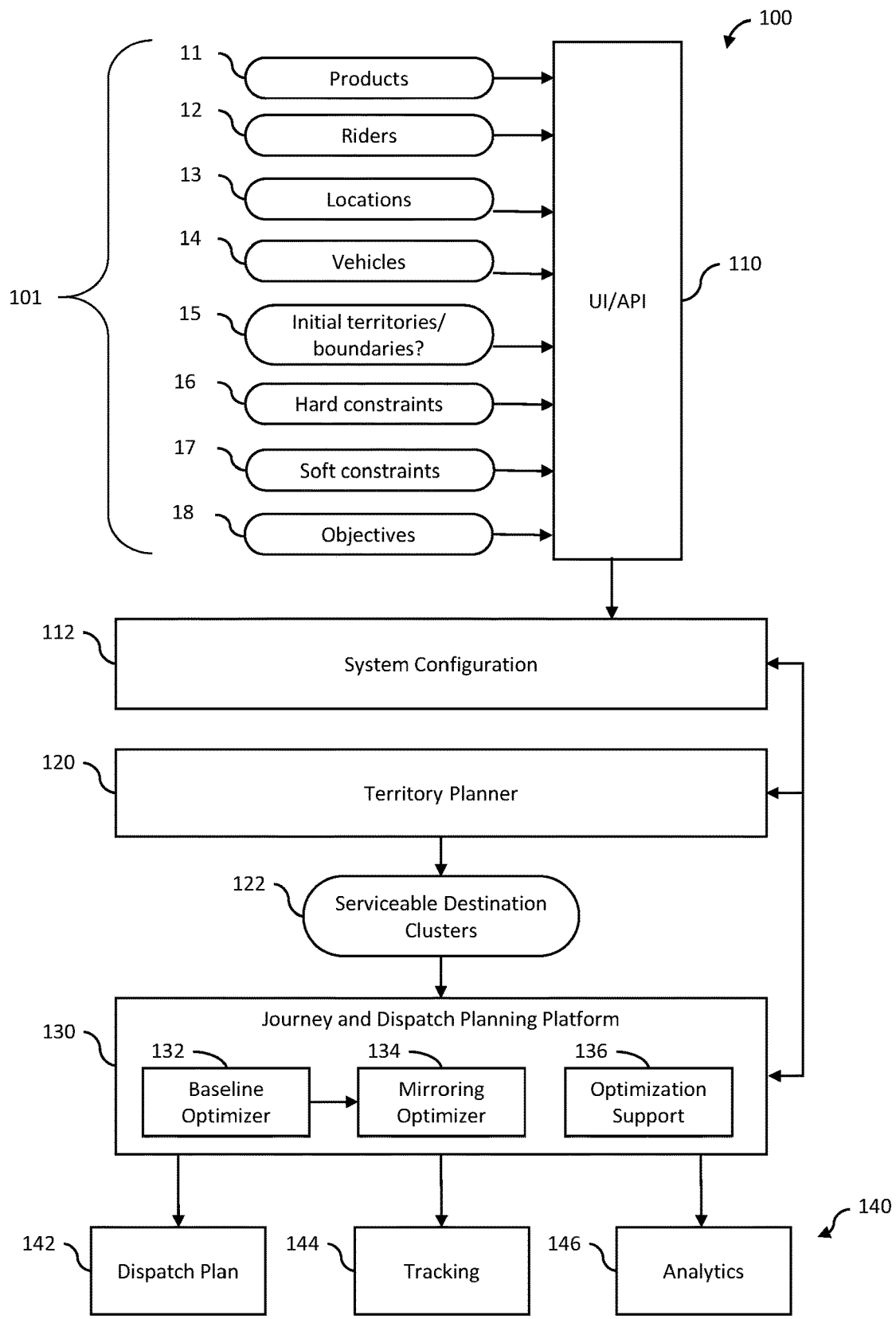
FIG. 1 is a schematic block diagram depicting certain aspects of an example computer system.

With reference to FIG. 1, there is illustrated an example computer system 100 (also referred to herein as system 100) which may be implemented and provided in a number of forms including, for example, as a cloud-based computing system, data center-based computing system, stand-alone computing system, distributed or virtual computing systems, or combinations thereof. System 100 is one example of computer-based system configured to perform automated scheduling and dispatching of a plurality of vehicle riders and/or a plurality of vehicles (hereinafter "riders/vehicles") to visit a plurality of destinations and to optimize such scheduling and dispatching with respect to a plurality of parameters.

Computer system 100 includes a UI/API 110 which may include one or both of a user interface (UI) and application programming interface (API). UI/API 110 is configured to receive a plurality of inputs 101 which may be input by a human user or a machine-based client (e.g., a client device, program, or system). In the illustrated example, inputs 101 include products input 11, riders input 12, locations inputs 13, vehicles input 14, initial territories or boundaries inputs 15, hard constraints 16, soft constraints 17, and objectives 18.

Products input 11 includes identifications of a set of product types to be included in a vehicle delivery route optimization (e.g., a set of uniquely identifying product type IDs). Products input 11 may also include information about product categories, product skill requirements (e.g., skills that a rider may need to demonstrate or inform a location proprietor about a product type or category), product qualification requirements (e.g., qualifications that a rider may need to possess to offer a product type or category), and/or other product-related information as will occur to one of skill in the art with the benefit and insight of the present disclosure.

Riders input 12 includes identifications of a set of riders to be included in a vehicle delivery route optimization (e.g., a set of uniquely identifying rider IDs). Riders input 12 may also include information about rider availability to work (e.g., days and hours of availability or unavailability), rider qualifications (e.g., expertise with one or more products or categories of products or lack thereof, qualification to service one or more locations or lack thereof, and/or qualification to operate one or more vehicles or lack thereof), rider-vehicle association information (e.g., an assignment of a rider to a particular vehicle or vehicles) and/or other rider-related information as will occur to one of skill in the art with the benefit and insight of the present disclosure.

Locations input 13 includes identifications of a set of locations to be included in a vehicle delivery route optimization (e.g., a set of uniquely identifying location IDs). Locations input 13 may also include location coordinate or geographic information (e.g., GPS, map area, or other geolocation information), location operating schedule information (e.g., days and hours that a location is open or closed or otherwise able or unable to receive deliveries), and/or other location-related information as will occur to one of skill in the art with the benefit and insight of the present disclosure.

Vehicles input 14 includes identifications of a set of vehicles to be included in vehicle delivery route optimization (e.g., a set of uniquely identifying vehicle IDs). Vehicles input 14 may also include vehicle capability or capacity information (e.g., vehicle task capacity, vehicle volume capacity, and/or vehicle distance or range capacity or limits), and/or other vehicle-related information as will occur to one of skill in the art with the benefit and insight of the present disclosure.

Initial territories or boundaries inputs 15 includes identifications of a set of initially defined territories or boundaries. Initial territories or boundaries inputs 15 may also include boundary or coordinate information (e.g., sets of GPS, map area, or other geolocation information), association information, and/or other territory or boundary-related information as will occur to one of skill in the art with the benefit and insight of the present disclosure. The association information may assign, link, or otherwise associate a given territory with a given rider and/or vehicle (also referred to herein as a "rider/vehicle" or "R/V"). Such association information may additionally or alternatively be provided in connection with riders input 12 and/or vehicles input 14.

Hard constraints 16 include constraints that must be followed in a final dispatch plan. Such constraints may include, for example, speed limit constraints, vehicle capacity limits, constraints on rider working hours, duration and/or time of day among other constraints as will occur to one of skill in the art with the benefit and insight of the present disclosure.

Soft constraints 17 that are preferably followed, but may be deviated from or modified and otherwise not necessarily followed in a final dispatch plan. Such constraints may include, for example, mirroring constraints or objectives, task balance or task equality constraints for a plurality of riders, among other constraints as will occur to one of skill in the art with the benefit and insight of the present disclosure.

Objectives 18 may include one or more optimization objectives, for example, rider/vehicle travel distance, rider/vehicle travel time, overlap of rider/vehicle travel routes, adherence to maximum vehicle capacity limits, minimum utilization of vehicles, balance and equality of count of tasks among the riders/vehicles, constraints on working hours, constraints on operating duration and/or operating times, and marketplace constraints (e.g., visit locations in a dense area or cluster to be visited by as few vehicles as possible) among other parameters. Objectives 18 may further include one or more mirroring objectives, for example, a value or values, range, limit, or heuristic according to a mirroring definition such as the one of the mirroring definitions described herein below.

UI/API 110 is configured and operable to provide inputs 101 to system configuration data store 112 which is configured to store in more or more non-transitory, computer-readable memory media a set of problem space parameters that include or are based upon inputs 101 and provide such parameters as inputs, references, or other bases upon which one or more vehicle delivery route optimization processes may operate. System configuration data store 112 may be provided in a number of forms and configurations including, for example, one or more databases, management systems, and/or other data store forms and configurations as will occur to one of skill in the art with the benefit and insight of the present disclosure.

System 100 further includes journey dispatch and planning platform 130 (JDP platform 130) and may optionally include territory planner 120 which may be present in certain embodiments and omitted in other embodiments. System configuration data store 112 may communicate to and/or be accessed or read by JDP platform 130. System configuration data store 112 may communicate to and/or be accessed or read by territory planner 120, where present.

Where present, territory planner 120 is configured and operable to determine a set of serviceable destination clusters 122 and provide the same to JDP platform 130. Territory planner 120 may determine serviceable destination clusters 122 according to a number of objectives or criteria, for example, objectives or criteria for a number of clusters of destinations, cluster size, cluster overlap, and/or other objectives according to which serviceable destination clusters may be identified or defined. Information of configuration data store 112 corresponding to, based upon, or otherwise relating to locations input 13 and/or initial territories or boundaries inputs 15 may be utilized by territory planner 120 in determining and providing serviceable destination clusters 122. It shall be appreciated that, in some embodiments, the territory planner 120 and serviceable destination clusters 122 may be omitted, and the operations of JDP platform 130 may provide alternative operation or may subsume the operation of territory planner 120.

JDP platform 130 is configured and operable to perform a vehicle delivery route optimization to determine and output a plurality of outputs 140 including a dispatch plan 142, tracking information 144, and analytics information 146. Dispatch plan 142 includes a plurality of vehicle delivery routes each corresponding to a respective rider/vehicle which have been optimized by JDP platform 130. Tracking information 144 may include aspects of dispatch plan 142 or information of JDP platform 130 that may be referenced and/or utilized by a vehicle/rider tracking system, such as the destination, route, and timing assignments for a plurality of vehicles/riders. Analytics information 146 may include aspects of dispatch plan 142 or information of JDP platform 130 that may be referenced and/or utilized by analytic engine to evaluate and update the optimizations performed by JDP platform 130.

JDP platform 130 may be configured and operable to perform a two phase optimization. For example, in the illustrated example, JDP platform 130 includes a baseline optimizer 132 which is configured and operable to perform a first optimization phase and a mirroring optimizer 134 which is configured and operable to perform a second optimization phase. JDP platform 130 may further include one or more optimization support components 136 such as libraries, computational engines, or other components which support the operation of baseline optimizer 132 and mirroring optimizer 134.

Baseline optimizer 132 may be configured and operable to perform a first optimization phase (also referred to as a baseline optimization or a baseline optimization phase) using any of a variety of multivariate cost functions, objective functions, or other optimization techniques to minimize one or more parameters. Such parameters may include, for example, rider/vehicle travel distance, rider/vehicle travel time, overlap of rider/vehicle travel routes, adherence to maximum and/or minimum vehicle capacity limits, maximum and/or minimum utilization of vehicles, balance and equality of count of tasks among the riders/vehicles, constraints on working hours, constraints on operating duration and/or operating times, and marketplace constraints (e.g., visit locations in a dense area or cluster to be visited by as few vehicles as possible) among other parameters. Baseline optimizer 132 need not, and for efficiency preferably does not, include mirroring parameters or an optimization of mirroring.

Figure 10:
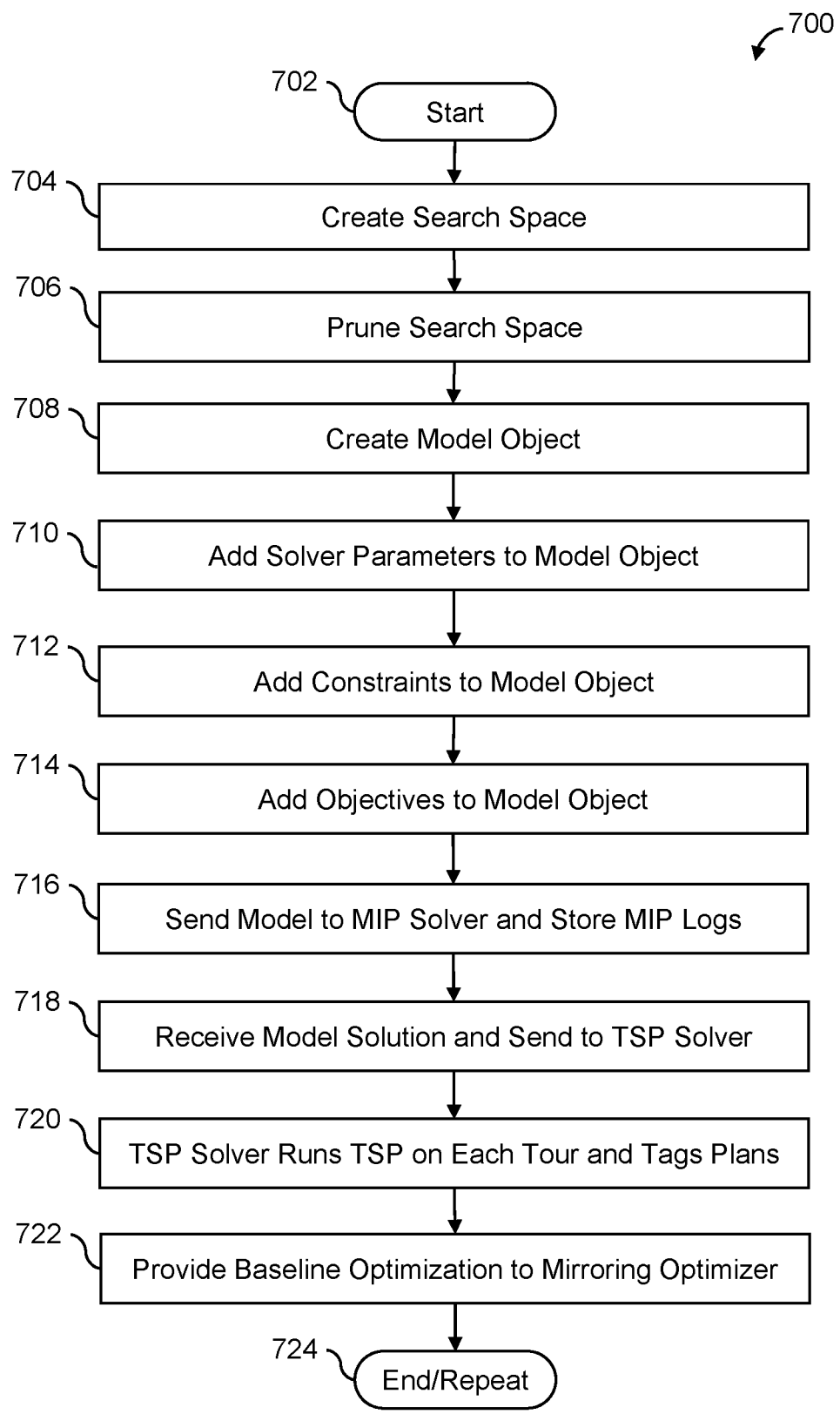
FIG. 10 is a flow diagram depicting certain aspects of an example process.

Baseline optimizer 132 may utilize a number of optimization algorithms and techniques. In certain embodiments, baseline optimizer may utilize an optimization algorithm or technique according to process 700 which is illustrated in FIG. 10. It shall be appreciated that process 700 is one example of a process that may be utilized to determine a baseline optimization which may, in turn, be utilized in connection with a subsequent mirroring optimization.

Process 700 begins at start operation 702 and proceeds to operation 704 which creates a search space. Operation 704 may create a search space utilizing inputs 101 or a subset thereof as well as additional information from other sources. An example search space may be defined as a subset (S) of an n-dimensional space (Rn) representing all candidate solutions for an optimization. The dimensions of n may include, for example, product dimension(s) corresponding to products input 11, rider dimension(s) corresponding to riders input 12, location dimension(s) corresponding to locations inputs 13, vehicle dimension(s) corresponding to vehicles input 14, and initial territory or boundary dimension(s) corresponding to initial territories or boundaries inputs 15, among other dimensions as will occur to one of skill in the art with the benefit and insight of the present disclosure.

From operation 704, process 700 proceeds to operation 706 which prunes the search space. Operation 706 may prunes the search space using one or more constraints, such as one or more constraints selected from hard constraints 16 and/or soft constraints 17, which may be applied using a pruning algorithm or heuristic to eliminate or remove solutions from the subset S of all candidate solutions for an optimization. It shall be appreciated that the pruning algorithm or heuristic may only partially or selectively apply constraints selected from hard constraints 16 and/or soft constraints 17 to narrow the search space rather than completely or rigorously applying such constraints as may occur in complete optimization.

From operation 706, process 700 proceeds to operation 708 which creates a model of the pruned search space which may include one or more model objects, hereinafter referred to as a model object. The model object(s) created by operation 708 may provide a form of the pruned search space adapted for subsequent optimization operations.

From operation 708, process 700 proceeds to operation 710 which adds solver parameters to the model object. Operation 710 may, for example, define and add to the model object the variables upon which an optimization solver operates.

From operation 710, process 700 proceeds to operation 712 which adds constraints to the model object. The constraints may be or may be based upon hard constraints 16 and/or soft constraints 17. It shall be appreciated, however, that the constraints added by operation 712 need not include and preferably omit mirroring constraints.

From operation 712, process 700 proceeds to operation 714 which adds objectives to the model object. The objectives may be or may be based upon objectives 18 or other objectives provided or defined in response to input to UI/API 110.

From operation 714, process 700 proceeds to operation 716 which sends the model to a mixed integer programming (MIP) solver and store mixed integer programming (MIP) logs. The MIP solver may utilize an MIP technique, such as a branch-and-bound search, to determine heuristic start solutions that may be further processed by a traveling salesperson (TSP) solver. The MIP heuristic start solutions may comprise localized solutions for clusters or localized groups of site visit graphs referred to as tours.

From operation 716, process 700 proceeds to operation 718 which receives a solution from the MIP solver (e.g., MIP heuristic start solutions determined by operation 716) and sends the solution to a traveling salesperson (TSP) solver. From operation 718, process 700 proceeds to operation 720 at which the TSP solver runs solutions for each tour and identifies or tags plans including optimized tour solutions to determine a baseline solution.

From operation 720, process 700 proceeds to operation 722 at which a baseline solution generated by the TSP solver is provided to a mirroring optimizer. For example, as illustrated in FIG. 1, a baseline optimization determined by baseline optimizer 132 is output to or otherwise provide to or accessed by mirroring optimizer 134.

Mirroring optimizer 134 is configured and operable to perform a second optimization phase (also referred to as a mirroring optimization or mirroring optimization phase) according to one or more mirroring optimization algorithms and techniques such as those described herein. In some forms, optimizer 134 is configured and operable to perform a mirroring optimization according to process 200 described herein in connection with FIG. 2. In some forms, optimizer 134 is configured and operable to perform a mirroring optimization according to process 300 described herein in connection with FIG. 3. In some forms, optimizer 134 is configured and operable to perform a mirroring optimization according to a combination of process 200 and process 300, or a variation or modification of process 200 and process 300 individually or in combination.

Figure 2:
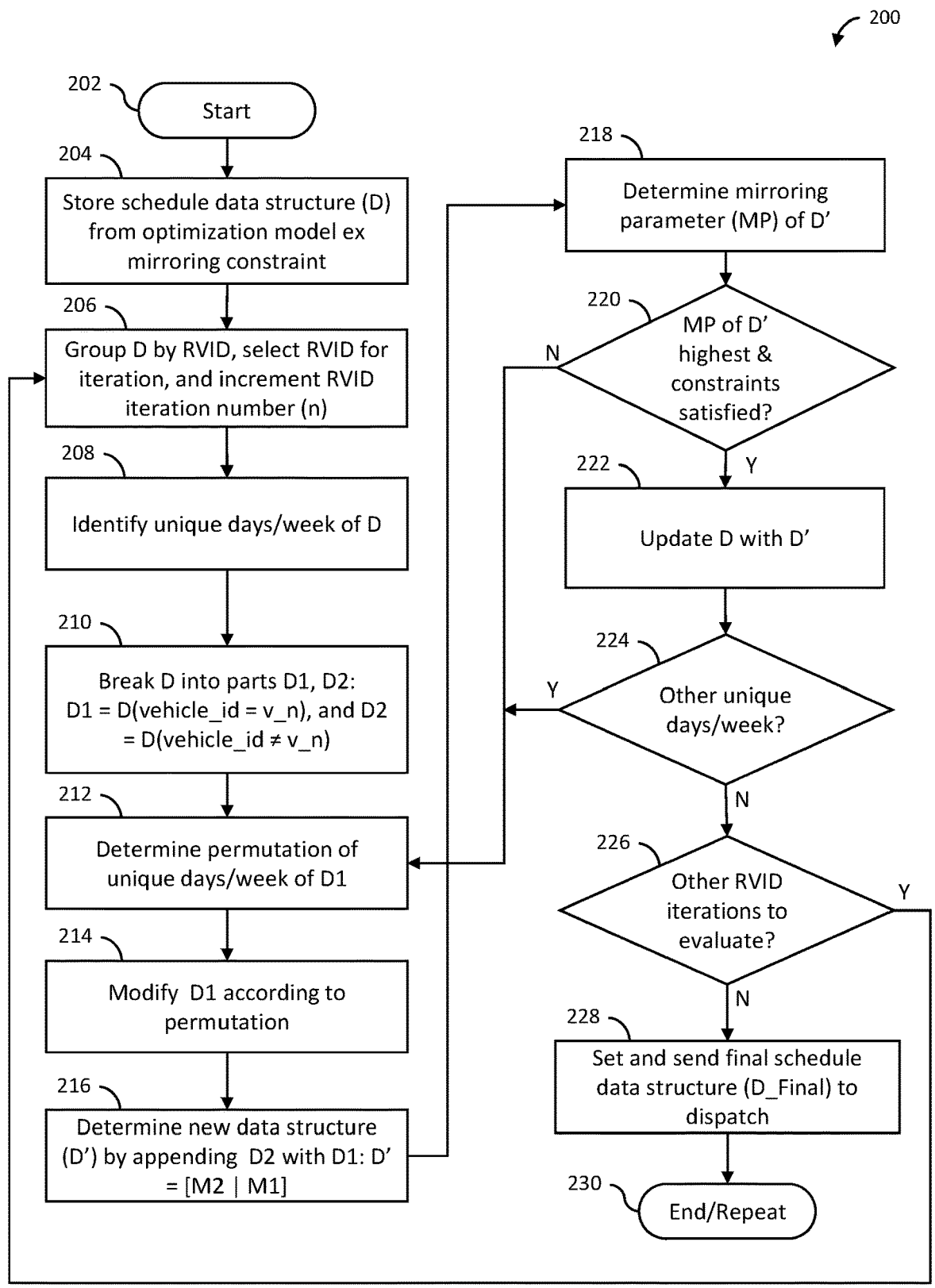
FIG. 2 is a flow diagram depicting certain aspects of an example process.

With reference to FIG. 2, there is illustrated, an example process 200 which may be implemented and performed by one or more components of a computer system such as system 100 or another computer system suitable to perform automated scheduling and dispatching a plurality of a riders/vehicles to visit a plurality of destinations and to perform an optimization of such scheduling and dispatching. Process 200 is one example of a method of optimizing mirroring of a schedule of visits of a plurality of a riders/vehicles to a plurality of destinations.

Process 200 begins with start operation 202 and proceeds to operation 204 which stores in a computer-readable memory medium a schedule data structure including a schedule of visits to a plurality of destinations over a plurality of weeks (also referred to herein as a "schedule data structure") which may be, for example, part of, the entirety of, or based upon or derived from the baseline optimization determined by baseline optimizer 132, or another schedule data structure. The schedule data structure may further associate the visits with respective rider/vehicle identification (RVID) parameters corresponding to the respective ones of a plurality of riders/vehicles. The RVID parameters may indicate the identity of a particular vehicle, a particular rider who will travel in a vehicle, or both a particular vehicle and a particular rider.

It shall be appreciated that the terms "schedule data structure," "schedule data structures," and the like refer inclusively to a variety of multi-dimensional schedule data structures (or associations, combinations, groups, or sets of uni-dimensional data structures, including, without limitation, arrays, data frames, graphs, linked lists, matrices, tables, trees, vectors, and associations, combinations, groups, or sets of the foregoing, among other examples as will occur to one of skill in the art with the benefit of the present disclosure.

The schedule data structure stored by operation 204 may be optimized for one or more parameters but non-optimized for mirroring. The schedule stored by operation 204 may be optimized using any of a variety of multivariate cost functions, objective functions, or other optimization techniques to minimize one or more parameters. Such parameters may include, for example, rider/vehicle travel distance, rider/vehicle travel time, overlap of rider/vehicle travel routes, adherence to maximum vehicle capacity limits, minimum utilization of vehicles, balance and equality of count of tasks among the riders/vehicles, constraints on working hours, constraints on operating duration and/or operating times, and marketplace constraints (e.g., visit locations in a dense area or cluster to be visited by as few vehicles as possible) among other parameters. Thus, for example, the schedule data structure stored by operation 204 may be optimized according to the baseline optimization determined by baseline optimizer 132.

In some embodiments, the schedule may be optimized for one or more traveling salesman problem (TSP) parameters. Such TSP parameters may include, for example, total journey or travel distance of a plurality of riders/vehicles. Such TSP parameters may further include the schedule being optimized for one or more of maximum rider/vehicle capacity, minimum rider/vehicle capacity, allocation of all tasks of a plurality of tasks to some rider/vehicle, balance of task count across a plurality of riders/vehicles, and minimum overlapping geographies between riders/vehicles.

It shall be appreciated that mirroring refers generally to and may be generally defined as the degree or extent to which a schedule of visits to a plurality of destinations repeats week-to-week, i.e., the degree or extent to which a visits to particular destinations on particular days (and potentially particular times or time ranges) occurring for one week of a schedule is the same for other week(s) of the schedule. Mirroring may be formally defined in a number of manners. For example, a mirroring parameter may be defined in terms of a percentage such as the number of locations with 100% (or another percentage) visits happening on the same day of the week over each of a plurality of weeks divided by the total number of locations.

Other formal definitions of mirroring are also contemplated, for example, mirroring percentage may be defined as a number of visits being repeated on the same day for the same location divided by the total number of visits, the total visits minus the number of unique occurrence days for all the locations divided by the total visits, or a number of other definitions as will occur to one of skill in the art with the benefit and insight of the present disclosure. Furthermore, mirroring definitions such as those disclosed herein can be extended or modified to include rider-based mirroring objectives, for example, where a single rider (or as few riders as possible) perform an initial visit and all subsequent visits (or as many subsequent visits as possible) for a given location.

It shall be appreciated that optimization of mirroring is preferably balanced or co-optimized with other optimization objectives such as those described elsewhere herein. An ideal or maximum optimization of mirroring such as attaining 100% repeat visits on the same day of the week for all locations (or another percentage) typically leads to inefficiencies in other objectives. Accordingly, certain preferred embodiments treat optimization of mirroring as soft constraint and operate to improve mirroring optimization over multiple iterations.

From operation 204, process 200 proceeds to operation 206 which groups the schedule data structure based on the RVID parameters and selects at least one RVID for iterative processing as described below. Operation 206 also increments an RVID iteration number which may be initially set to an initial value (e.g., zero or a non-zero initial value) and incremented from that initial value each time operation 206 is performed. Accordingly, the RVID iteration number may be utilized to account for the number of iterations of operation 206 or of a first control loop starting with operation 206.

From operation 206, process 200 proceeds to operation 208 which identifies any unique day(s) of the week across plurality of weeks on which a visit to one or more locations was made (hereinafter "unique days/week").

From operation 208, process 200 proceeds to operation 210 which breaks the schedule data structure into a first part (D1) and a second part (D2). The first part (D1) may comprise visits which are only associated with a particular one of the RVID parameters. The second part (D2) may comprise visits which are only not associated with the particular one of the RVID parameters. Thus, while the first part (D1) and the second part (D2) may comprise visits as well as other parameters from the initial data structure from which arise, the visits of first part (D1) and the visits of the second part (D2) are mutually exclusive with the former being only of a particular RVID parameter, and the latter being any and all other RVID parameters. Thus, each RVID parameter can serve as a unique identification on rider/vehicle.

From operation 210, process 200 proceeds to operation 212 which determines a permutation of unique days/week of the first part (D1). The permutation may be determined by calculating an iterated linear solution of the unique days/week of D1. For example, operation 212 may start with an initial list of unique days/week (e.g., [Monday, Tuesday, Wednesday, Thursday, Friday]) and determine a permutation of the initial list of unique days/week (e.g., [Monday, Wednesday, Friday, Thursday, Tuesday]). The iterated linear solution may be calculated using a number of techniques and algorithms including, for example, classical splitting approach techniques. It shall be appreciated that multiple executions or iterations of operation 212 may be performed to account for all of (or an acceptably comprehensive number of) the permutations of linear solutions of the unique days/week. It shall be further appreciated that the permutations and iterated linear solutions of operation 212 preferably respect and preserve the constraints imposed by the baseline optimization of the schedule data structure.

From operation 212, process 200 proceeds to operation 214 which determines a new first part (D1') by modifying the first part (D) according to the permutation determined at operation 212. The permutation determined by operation 212 may optimize improve mirroring, however, it is not necessary to evaluate or determine a mirroring optimization or improvement at this point and such evaluation or determination may be deferred until a later operation of process 200.

From operation 214, process 200 proceeds to operation 216 which determines a new schedule data structure (D') by appending the second part (D2) with the new first part (D1').

From operation 216, process 200 proceeds to operation 218 which determines a mirroring parameter (MP) of the new schedule data structure (D'). The minoring parameter (MP) may be, for example, a mirroring percentage or other metric or indication of the degree or extent of mirroring in the new schedule data structure (D') such the examples as described herein above.

From operation 218, process 200 proceeds to conditional 220 which evaluates whether the value of MP is the highest of all values of MP determined over multiple iterations of operations 212, 214, and 216. Conditional 220 also evaluates whether the new schedule data structure (D') satisfies one or more overlap constraint conditions. The one or more overlap constraint conditions may be established according to a number of definitions for the amount, degree, or number of overlapping areas, territories, and/or travel routes for different riders/vehicles of a schedule data structure.

If conditional 220 evaluates negative, process 200 proceeds to operation 212 and further proceeds as described above. If conditional 220 evaluates affirmative, process 200 proceeds to operation 222.

It shall be appreciated that conditional 220, like other evaluations disclosed herein, could be structured with other alternative or equivalent logic, for example, by evaluating inverse logic arguments or other logical arguments variants (e.g., evaluating whether any value higher than the mirroring parameter (MP) exists for the new schedule data structure or whether one or more overlap constraint violations have occurred.) and that the resulting affirmative/negative outcome of such evaluations would differ from that of the illustrated embodiment, for example, with an affirmative evaluation proceeding to operation 212 and a negative evaluation proceeding to operation 222.

Operation 222 updates the schedule data structure (D) to reflect the new schedule data structure (D'), for example, by overwriting one or more locations or addresses of a computer-readable memory medium or by writing to new addresses or locations of a computer-readable memory medium.

From operation 222, process 200 proceeds to conditional 224 which evaluates whether any other unique days/week remain unevaluated in the schedule data structure (D). If conditional 224 evaluates affirmative, process 200 proceeds to operation 212 and further proceeds as described above. If conditional 224 evaluates negative, process 200 proceeds to conditional 226.

It shall be appreciated that conditional 224, like other evaluations disclosed herein, could be structured with other alternative or equivalent logic, for example, by evaluating whether all unique days/week have been evaluated or whether a last unique days/week iteration has been reached, and that the resulting affirmative/negative outcome of such evaluations would differ from that of the illustrated embodiment, for example, with a negative evaluation proceeding to operation 212 and an affirmative evaluation proceeding to conditional 226.

Conditional 226 evaluates whether there are any other RVID iterations remaining to be evaluated. If conditional 226 evaluates affirmative, process 200 proceeds to operation 206 and further proceeds as described above. If conditional 226 evaluates negative, process 200 proceeds to operation 228.

It shall be appreciated that conditional 226, like other evaluations disclosed herein, could be structured with other alternative or equivalent logic, for example, by evaluating whether all RVID iterations have been evaluated, and that the resulting affirmative/negative outcome of such evaluations would differ from that of the illustrated embodiment, for example, with a negative evaluation proceeding to operation 206 and an affirmative evaluation proceeding to operation 228.

Operation 228 sets a final, mirroring-optimized or mirroring-improved schedule data (D_mopt) according to the schedule data structure (D) resulting from the foregoing iterative processes and sends the final schedule data (D_mopt) to one or more dispatching components, operators, and/or systems which thereafter dispatch riders/vehicles according to the net mirroring-improved schedule data structure represented by the final schedule data (D_mopt). From operation 228, process 200 proceeds to operation 230 and may end or repeat.

Figure 3:
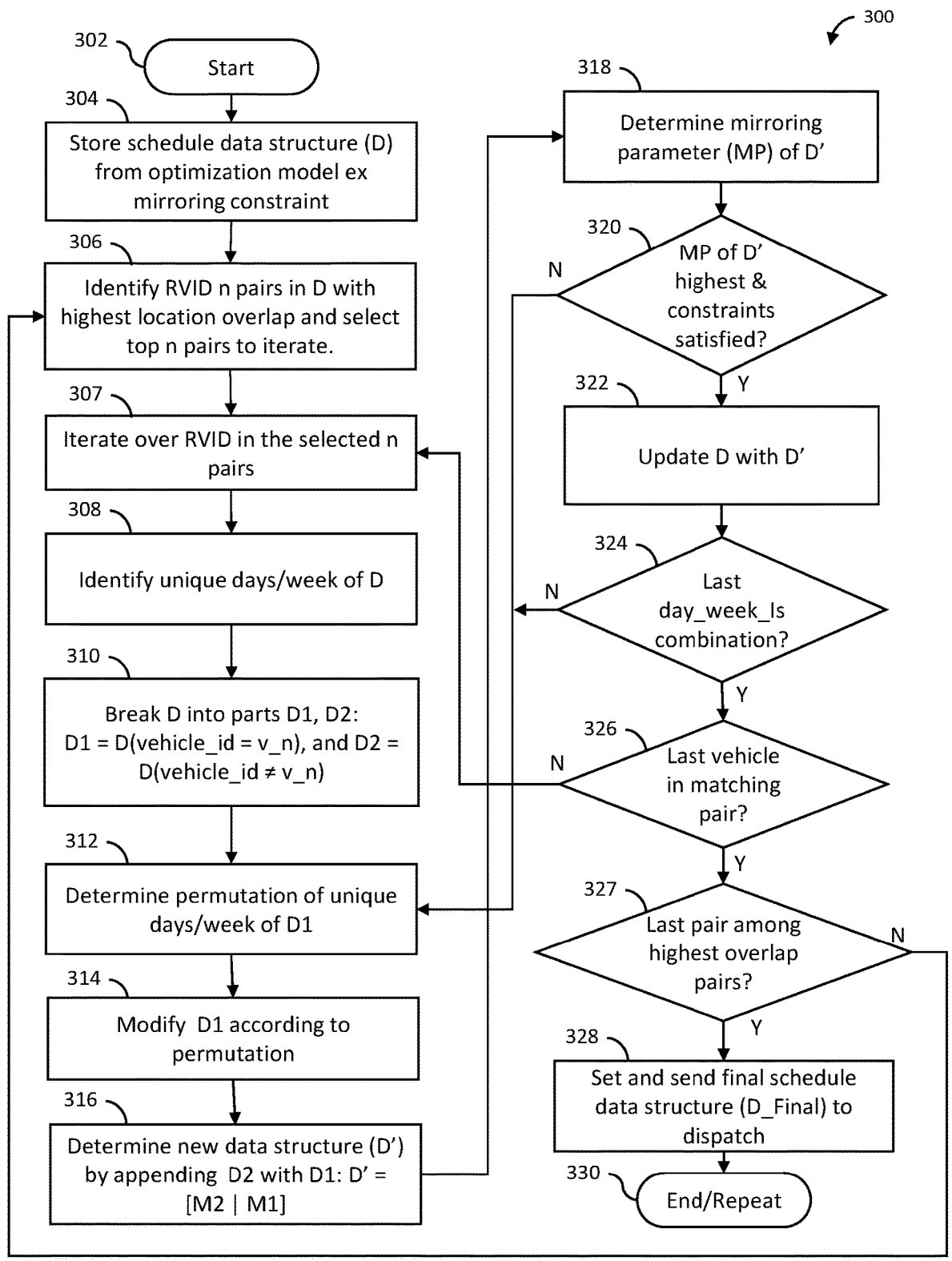
FIG. 3 is a flow diagram depicting certain aspects of an example process.

With reference to FIG. 3, there is illustrated an example process 300 which may be implemented and performed by one or more components of a computer system such as system 100 or another computer system suitable to perform automated scheduling and dispatching a plurality of a riders/vehicles to visit a plurality of destinations and to perform an optimization of such scheduling and dispatching. Process 300 is one example of a method of optimizing mirroring of a schedule of visits of a plurality of a riders/vehicles to a plurality of destinations.

Process 300 begins with start operation 302 and proceeds to operation 304 which stores in a computer-readable memory medium a schedule data structure including a schedule of visits to a plurality of destinations over a plurality of weeks (also referred to herein as a "schedule data structure") which may be, for example, part of, the entirety of, or based upon or derived from the baseline optimization determined by baseline optimizer 132, or another schedule data structure. The schedule data structure may further associate the visits with respective rider/vehicle identification (RVID) parameters corresponding to the respective ones of a plurality of riders/vehicles. The RVID parameters may indicate the identity of a particular vehicle, a particular rider who will travel in a vehicle, or both a particular vehicle and a particular rider.

The schedule data structure stored by operation 304 may be optimized for one or more parameters but non-optimized for mirroring. The schedule stored by operation 304 may be optimized using any of a variety of multivariate cost functions, objective functions, or other optimization techniques to minimize one or more parameters. Such parameters may include, for example, rider/vehicle travel distance, rider/vehicle travel time, overlap of rider/vehicle travel routes, adherence to maximum vehicle capacity limits, minimum utilization of vehicles, balance and equality of count of tasks among the riders/vehicles, constraints on working hours, constraints on operating duration and/or operating times, and marketplace constraints (e.g., visit locations in a dense area or cluster to be visited by as few vehicles as possible) among other parameters. Thus, for example, the schedule data structure stored by operation 304 may be optimized according to the baseline optimization determined by baseline optimizer 132.

In some embodiments, the schedule may be optimized for one or more traveling salesman problem (TSP) parameters. Such TSP parameters may include, for example, total journey or travel distance of a plurality of riders/vehicles. Such TSP parameters may further include the schedule being optimized for one or more of maximum rider/vehicle capacity, minimum rider/vehicle capacity, allocation of all tasks of a plurality of tasks to some rider/vehicle, balance of task count across a plurality of riders/vehicles, and minimum overlapping geographies between riders/vehicles.

From operation 304, process 300 proceeds to operation 306 which identifies a number (n) of RVID pairs with the highest location overlap and selects the top n pairs to iterate. The highest location overlap may be defined in a number of manners including. In some embodiment, overlap may be defined and measured based upon coincidence of location at a given time or times, a given time range or ranges, or without regard to time or time range. In some embodiment, overlap may be defined and measured based upon a number of destination nodes associated with one RVID of an RVID pair that encroach into a polygonal hull constructed around all destination nodes associated with another RVID of an RVID pair. In some embodiment, overlap may be defined and measured based upon an overlap area of a first polygonal hull constructed around all destination nodes associated with a first one RVID of an RVID pair with a second polygonal hull constructed around all destination nodes associated with a second RVID of the RVID pair.

From operation 306, process 300 proceeds to operation 307 iterates over RVID pairs in the selected n pairs. Operation may also increment an RVID pair iteration number which may be initially set to an initial value (e.g., zero or a non-zero initial value) and incremented from that initial value each time operation 307 is performed. Accordingly, the RVID pair iteration number may be utilized to account for the number of iterations of operation 307 or of a first control loop starting with operation 307.

From operation 306, process 300 proceeds to operation 308 which identifies any unique day(s) of the week across plurality of weeks on which a visit to one or more locations was made (hereinafter "unique days/week").

From operation 308, process 300 proceeds to operation 310 which breaks the schedule data structure into a first part (D1) and a second part (D2). The first part (D1) may comprise visits which are only associated with a particular one of the RVID parameters. The second part (D2) may comprise visits which are only not associated with the particular one of the RVID parameters. Thus, while the first part (D1) and the second part (D2) may comprise visits as well as other parameters from the initial data structure from which arise, the visits of first part (D1) and the visits of the second part (D2) are mutually exclusive with the former being only of a particular RVID parameter, and the latter being any and all other RVID parameters. Thus, each RVID parameter can serve as a unique identification on rider/vehicle.

From operation 310, process 300 proceeds to operation 312 which determines a permutation of unique days/week of the first part (D1). The permutation may be determined by calculating an iterated linear solution of the unique days/week of D1. For example, operation 312 may start with an initial list of unique days/week (e.g., [Monday, Tuesday, Wednesday, Thursday, Friday]) and determine a permutation of the initial list of unique days/week (e.g., [Monday, Wednesday, Friday, Thursday, Tuesday]). The iterated linear solution may be calculated using a number of techniques and algorithms including, for example, classical splitting approach techniques. It shall be appreciated that multiple executions or iterations of operation 312 may be performed to account for all of (or an acceptably comprehensive number of) the permutations of linear solutions of the unique days/week. It shall be further appreciated that the permutations and iterated linear solutions of operation 312 preferably respect and preserve the constraints imposed by the baseline optimization of the schedule data structure.

From operation 312, process 300 proceeds to operation 314 which determines a new first part (D1') by modifying the first part (D) according to the permutation determined at operation 312. The permutation determined by operation 312 may optimize improve mirroring, however, it is not necessary to evaluate or determine a mirroring optimization or improvement at this point and such evaluation or determination may be deferred until a later operation of process 300.

From operation 314, process 300 proceeds to operation 316 which determines a new schedule data structure (D') by appending the second part (D2) with the new first part (D1').

From operation 316, process 300 proceeds to operation 318 which determines a mirroring parameter (MP) of the new schedule data structure (D'). The mirroring parameter (MP) may be, for example, a mirroring percentage or other metric or indication of the degree or extent of mirroring in the new schedule data structure (D') such the examples as described herein above.

From operation 318, process 300 proceeds to conditional 320 which evaluates whether the value of MP is the highest of all values of MP determined over multiple iterations of operations 312, 314, and 316. Conditional 320 also evaluates whether the new schedule data structure (D') satisfies one or more overlap constraint conditions. The one or more overlap constraint conditions may be established according to a number of definitions for the amount, degree, or number of overlapping areas, territories, and/or travel routes for different riders/vehicles of a schedule data structure.

If conditional 320 evaluates negative, process 300 proceeds to operation 312 and further proceeds as described above. If conditional 320 evaluates affirmative, process 300 proceeds to operation 322.

It shall be appreciated that conditional 320, like other evaluations disclosed herein, could be structured with other alternative or equivalent logic, for example, by evaluating inverse logic arguments or other logical arguments variants (e.g., evaluating whether any value higher than the mirroring parameter (MP) exists for the new schedule data structure or whether one or more overlap constraint violations have occurred.) and that the resulting affirmative/negative outcome of such evaluations would differ from that of the illustrated embodiment, for example, with an affirmative evaluation proceeding to operation 312 and a negative evaluation proceeding to operation 322.

Operation 322 updates the schedule data structure (D) to reflect the new schedule data structure (D'), for example, by overwriting one or more locations or addresses of a computer-readable memory medium or by writing to new addresses or locations of a computer-readable memory medium.

From operation 322, process 300 proceeds to conditional 324 which evaluates whether any other unique days/week remain unevaluated in the schedule data structure (D). If conditional 324 evaluates affirmative, process 300 proceeds to operation 312 and further proceeds as described above. If conditional 324 evaluates negative, process 300 proceeds to conditional 326.

It shall be appreciated that conditional 324, like other evaluations disclosed herein, could be structured with other alternative or equivalent logic, for example, by evaluating whether all unique days/week have been evaluated or whether a last unique days/week iteration has been reached, and that the resulting affirmative/negative outcome of such evaluations would differ from that of the illustrated embodiment, for example, with a negative evaluation proceeding to operation 312 and an affirmative evaluation proceeding to conditional 326.

Conditional 326 evaluates whether there are any other RVID pair iterations remaining to be evaluated. If conditional 326 evaluates affirmative, process 300 proceeds to operation 306 and further proceeds as described above. If conditional 326 evaluates negative, process 300 proceeds to conditional 327.

It shall be appreciated that conditional 326, like other evaluations disclosed herein, could be structured with other alternative or equivalent logic, for example, by evaluating whether all RVID pair iterations have been evaluated, and that the resulting affirmative/negative outcome of such evaluations would differ from that of the illustrated embodiment, for example, with a negative evaluation proceeding to operation 306 and an affirmative evaluation proceeding to conditional 327.

Conditional 327 evaluates whether the pair is the last pair among the n pairs with the greatest overlap selected for iteration at operation 306. If conditional 327 evaluates negative, process 300 proceeds to operation 306 and further proceeds as described above. If conditional 326 evaluates affirmative, process 300 proceeds to operation 328.

It shall be appreciated that conditional 327, like other evaluations disclosed herein, could be structured with other alternative or equivalent logic, for example, by evaluating whether a pair mismatch condition exists, and that the resulting affirmative/negative outcome of such evaluations would differ from that of the illustrated embodiment, for example, with an affirmative evaluation proceeding to operation 306 and a negative evaluation proceeding to operation 328.

Operation 328 sets a final, mirroring-optimized or mirroring-improved schedule data (D_mopt) according to the schedule data structure (D) resulting from the foregoing iterative processes and sends the final schedule data (D_mopt) to one or more dispatching components, operators, and/or systems which thereafter dispatch riders/vehicles according to the net mirroring-improved schedule data structure represented by the final schedule data (D_mopt). From operation 328, process 300 proceeds to operation 330 and may end or repeat.

With reference to FIGS. 4-9, there are illustrated example data structures and portions thereof at various points in a mirroring optimization process such as process 200 or process 300. FIG. 4 schematically depicts certain aspects of a schedule data structure 400 which is one example of a schedule data structure that may be optimized for multiple parameters such as those described herein above but non-optimized for mirroring and that may include a schedule of visits to a plurality of destinations over a plurality of weeks by respective riders/vehicles as may be indicated by an RVID parameters.

In the illustrated example, schedule data structure 400 includes visits to a plurality of locations (indicated as L=1, L=2, L=3) by a plurality of riders/vehicles (indicated as R/V=a, R/V=b, R/V=c) on one or more days over a plurality of weeks. Schedule data structure 400 may also include various other parameters as will occur to one of skill in the art with the benefit and insight of the present disclosure.

As indicated by the division operator, schedule data structure 400 may be broken into a first part 410 and a second part 420. The first part 410 includes schedule parameters for one of the plurality of R/V values (R/V=a). The second part 420 includes schedule parameters for the others of the plurality of R/V values (R/V=b, R/V=c).

Figure 5:
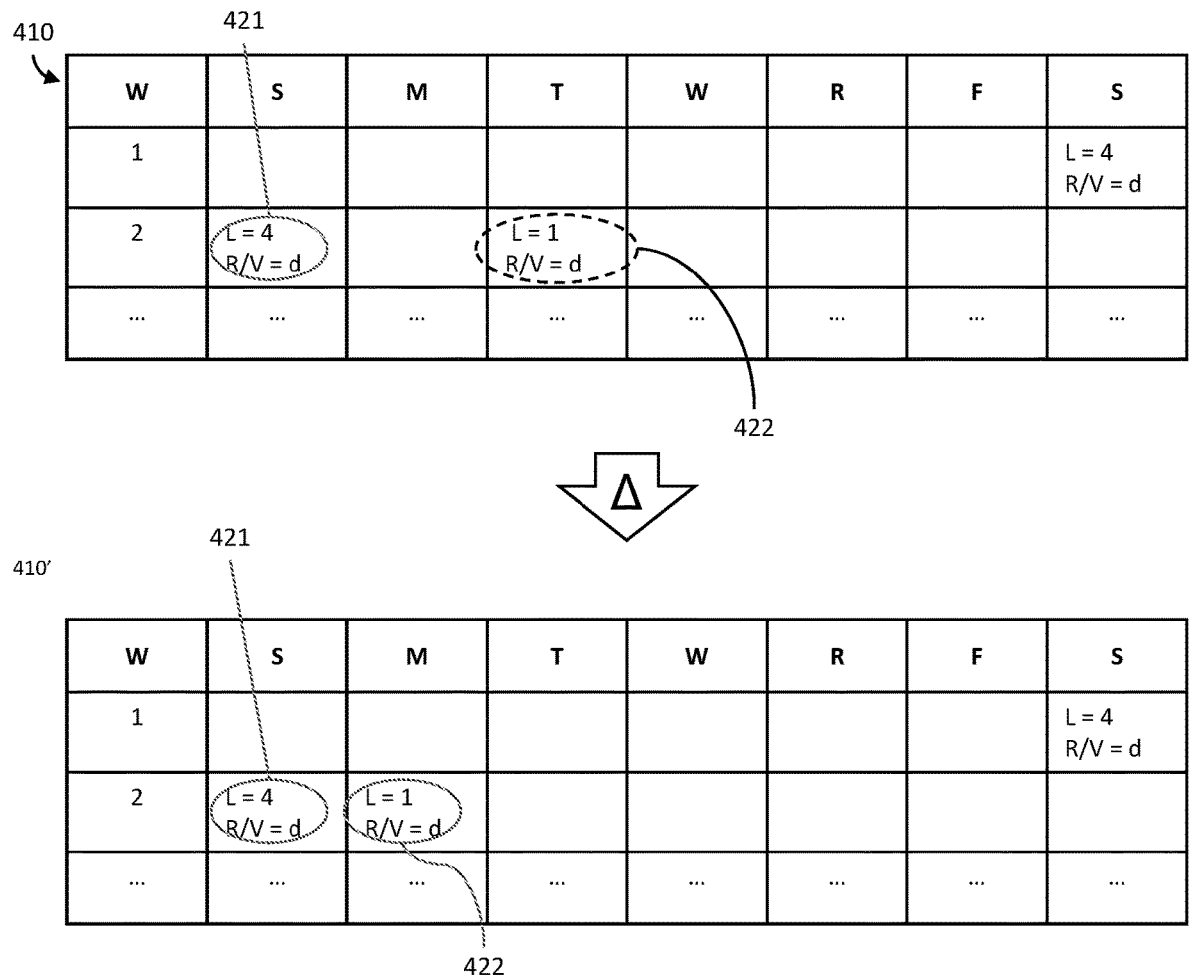

FIG. 5 schematically depicts a unique days/week mitigation operation indicated by the delta operator which is performed on the first part 410 to determine a new first part 410'. In the example unique days/week permutation operation unique days/week 421, 422 are permutated by moving all visits from one day to another day and vice versa for a given R/V value. Thus, in the illustrated example visit L=1 for R/V=d is moved from Tuesday to Monday. Since there is no visit on Monday, there is no visit moved to Tuesday; however, if a visit were present on Monday, it would move to Tuesday.

Figure 6:
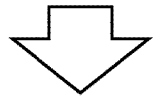

FIG. 6 schematically depicts an appending operation denoted by the ampersand operator which is performed with the second part 420 and the new first part 410' to determine a new schedule data structure 500.

Figure 7:

FIG. 7 schematically depicts the breaking of schedule data structure 500 into a first part 510 and a second part 520. The first part 410 includes schedule parameters for one of the plurality of R/V values (R/V=b). The second part 420 includes schedule parameters for the others of the plurality of R/V values (R/V=a, R/V=c).

Figure 8:
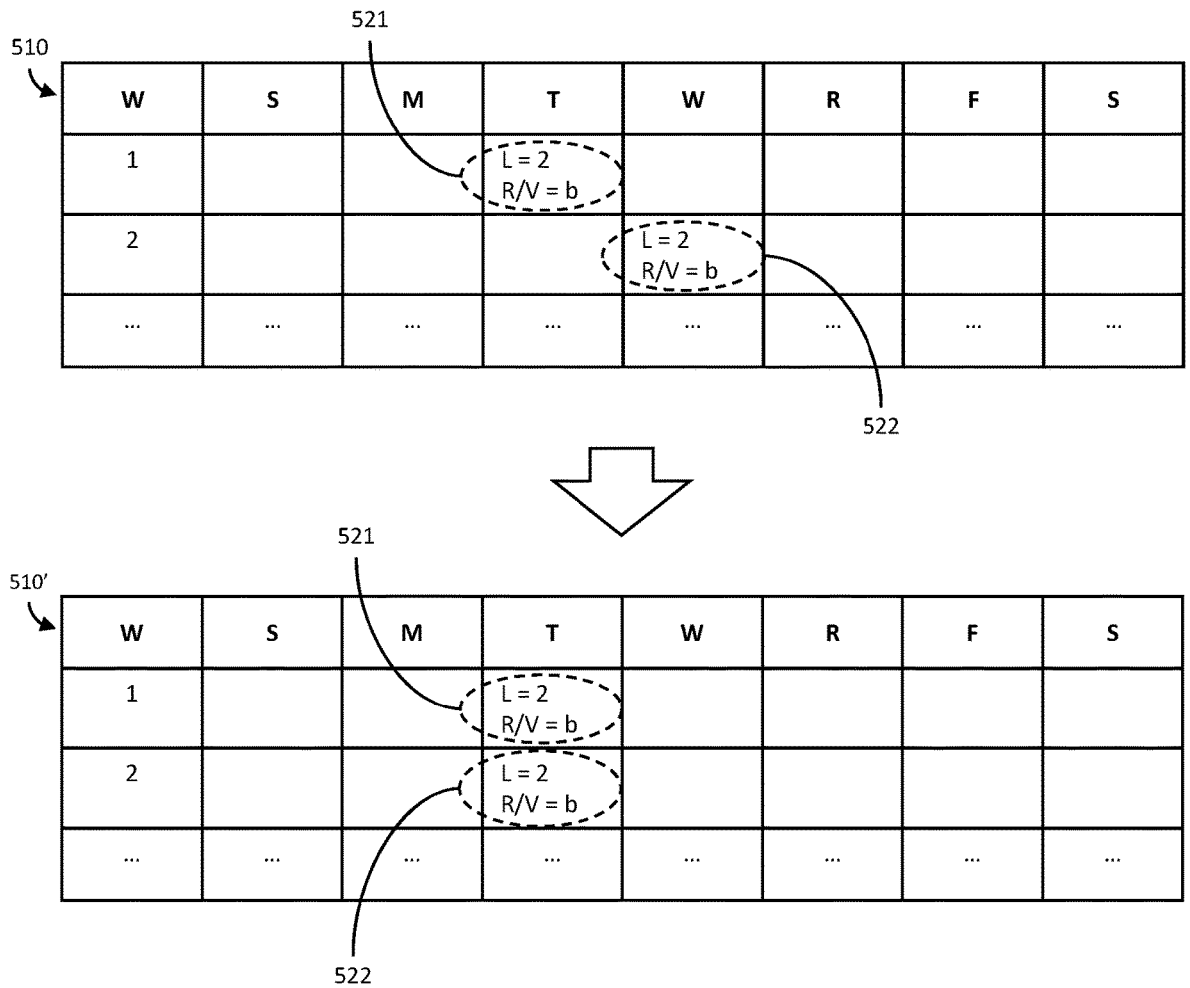

FIG. 8 schematically depicts a unique days/week mitigation operation indicated by the delta operator which is performed on the first part 510 to determine a new first part 510'. In the example unique days/week mitigation operation unique days/week 521, 522 are mitigated by moving unique days/week 521, 522 to the same day of the week.

FIG. 9 schematically depicts an appending operation denoted by the ampersand operator which is performed with the second part 520 and the new first part 510' to determine a new schedule data structure 600.

It shall be appreciated that the breaking, unique day/week mitigating, and appending operations described in connection with FIGS. 4-9 may be repeated for other R/V values such as R/V=c, R/V=d, or other values of R/V not depicted in the illustrated example.

As shown by this detailed description, the present disclosure contemplates multiple and various embodiments, including, without limitation, the following example embodiments. A first example embodiment is a method of optimizing scheduling and dispatching of a plurality of riders/vehicles to visit a plurality of destinations, the method comprising: storing in a computer-readable memory medium a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring; breaking the schedule data structure into a first part and a second part, the first part including only visits associated with a particular one of the RVID parameters, the second part including only visits not associated with the particular one of the RVID parameters; determining a modified first part, the modified first part being modified according to a permutation of unique days/week of the first part; appending the modified first part with the second part to provide a modified schedule data structure; repeating the breaking, the determining and the appending for each of the RVID parameters to provide a plurality of modified schedule data structures, the plurality including the modified schedule data structure; determining from the plurality of modified schedule data structures a mirroring-improved schedule data structure; and providing the mirroring-improved schedule data structure to control dispatch of the plurality of riders/vehicles.

A second example embodiment includes the features of the first example embodiment, wherein the determining the mirroring-improved schedule data includes calculating a mirror parameter (MP) for each of the plurality of modified schedule data structures and identifying one of the plurality of modified schedule data structures with an optimized MP.

A third example embodiment includes the features of the first example embodiment, wherein the schedule being optimized for one or more parameters includes the schedule being optimized for total rider/vehicle travel distance.

A fourth example embodiment includes the features of the third example embodiment, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

A fifth example embodiment includes the features of the first example embodiment, and comprises: prior to the breaking, grouping the schedule data structure based on the RVID parameters and selecting at least one RVID for the breaking.

A sixth example embodiment includes the features of the first example embodiment, and comprises: prior to the breaking, grouping RVID pairs in the schedule data structure according to at least one location overlap criterion and selecting at least one RVID pair for the breaking.

A seventh example embodiment includes the features of the first example embodiment, and comprises: further repeating the breaking, determining, appending, and repeating for all RVIDs in the schedule of visits.

A eighth example embodiment is a system of optimizing scheduling and dispatching of a plurality of riders/vehicles to visit a plurality of destinations, the system comprising: a non-transitory computer-readable memory medium configured to store a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring; and one or more processors configured to perform a plurality of operations including: break the schedule data structure into a first part and a second part, the first part including only visits associated with a particular one of the RVID parameters, the second part including only visits not associated with the particular one of the RVID parameters, determine a modified first part, the modified first part being modified according to a permutation of unique days/week of the first part, append the modified first part with the second part to provide a modified schedule data structure, repeat the break, determine, and append operations for each of the RVID parameters to provide a plurality of modified schedule data structures, the plurality including the modified schedule data structure, determine from the plurality of modified schedule data structures a mirroring-improved schedule data structure, and provide the mirroring-improved schedule data structure to control dispatch of the plurality of riders/vehicles.

A ninth example embodiment includes the features of the eighth example embodiment, and comprises: the one or more processors being configured to determine the mirroring-improved schedule data by calculating a mirror parameter (MP) for each of the plurality of modified schedule data structures and identifying one of the plurality of modified schedule data structures with an optimized MP.

A tenth example embodiment includes the features of the eighth example embodiment, wherein the schedule being optimized for one or more parameters includes the schedule being optimized for total rider/vehicle travel distance.

An eleventh example embodiment includes the features of the tenth example embodiment, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

A twelfth example embodiment includes the features of the eighth example embodiment, wherein the one or more processors are configured to, prior to the breaking, group the schedule data structure based on the RVID parameters and selecting at least one RVID for the breaking.

A thirteenth example embodiment includes the features of the eighth example embodiment, wherein the one or more processors are configured to, prior to the breaking, group RVID pairs in the schedule data structure according to at least one location overlap criterion and selecting at least one RVID pair for the breaking.

A fourteenth example embodiment includes the features of the eighth example embodiment, wherein the one or more processors are configured to repeat for all RVIDs in the schedule of visits the operations: break the schedule data structure into the first part and the second part, determine the modified first part, append the modified first part with the second part to provide the modified schedule data structure, and repeat the break, determine and append operations for each of the RVID parameters.

A fifteenth example embodiment is an apparatus for optimizing scheduling and dispatching of a plurality of riders/vehicles to visit a plurality of destinations, the apparatus comprising: a non-transitory computer-readable memory medium configured with instructions executable by one or more processors to process a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring by performing the acts of: breaking the schedule data structure into a first part and a second part, the first part including only visits associated with a particular one of the RVID parameters, the second part including only visits not associated with the particular one of the RVID parameters, determining a modified first part, the modified first part being modified according to a permutation of unique days/week of the first part, appending the modified first part with the second part to provide a modified schedule data structure, repeating the acts of breaking, determining and appending for each of the RVID parameters to provide a plurality of modified schedule data structures, the plurality including the modified schedule data structure, determining from the plurality of modified schedule data structures a mirroring-improved schedule data structure, and providing the mirroring-improved schedule data structure to control dispatch of the plurality of riders/vehicles.

A sixteenth example embodiment includes the features of the fifteenth example embodiment, wherein the determining the mirroring-improved schedule data includes calculating a mirror parameter (MP) for each of the plurality of modified schedule data structures and identifying one of the plurality of modified schedule data structures with an optimized MP.

A seventeenth example embodiment includes the features of the fifteenth example embodiment, wherein the schedule being optimized for one or more parameters includes the schedule being optimized for total rider/vehicle travel distance.

A eighteenth example embodiment includes the features of the seventeenth example embodiment, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

A nineteenth example embodiment includes the features of the fifteenth example embodiment, wherein the instructions are executable by the one or more processors to, prior to the act of breaking, perform the act of grouping the schedule data structure based on the RVID parameters and selecting at least one RVID for the breaking.

A twentieth example embodiment includes the features of the fifteenth example embodiment, wherein the instructions are executable by the one or more processors to, prior to the breaking, perform the act of grouping RVID pairs in the schedule data structure according to at least one location overlap criterion and selecting at least one RVID pair for the breaking.

A twenty-first example embodiment includes the features of the fifteenth example embodiment, wherein the instructions are executable by the one or more processors to perform the act of further repeating the breaking, determining, appending, and repeating for all RVIDs in the schedule of visits.

It shall be appreciated the terms "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of optimizing scheduling and dispatching of a plurality of riders/vehicles to visit a plurality of destinations, the method comprising:

storing in a computer-readable memory medium a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring;

breaking the schedule data structure into a first part and a second part, the first part including only visits associated with a particular one of the RVID parameters, the second part including only visits not associated with the particular one of the RVID parameters;

determining a modified first part, the modified first part being modified according to a permutation of unique days/week of the first part;

appending the modified first part with the second part to provide a modified schedule data structure;

repeating the breaking, the determining and the appending for each of the RVID parameters to provide a plurality of modified schedule data structures, the plurality including the modified schedule data structure;

determining from the plurality of modified schedule data structures a mirroring-improved schedule data structure; and providing the mirroring-improved schedule data structure to control dispatch of the plurality of riders/vehicles.

2. The method of claim 1, wherein the determining the mirroring-improved schedule data includes calculating a mirror parameter (MP) for each of the plurality of modified schedule data structures and identifying one of the plurality of modified schedule data structures with an optimized MP.

3. The method of claim 1, wherein the schedule being optimized for one or more parameters includes the schedule being optimized for total rider/vehicle travel distance.

4. The method of claim 3, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

5. The method of claim 1, comprising prior to the breaking, grouping the schedule data structure based on the RVID parameters and selecting at least one RVID for the breaking.

6. The method of claim 1, comprising prior to the breaking, grouping RVID pairs in the schedule data structure according to at least one location overlap criterion and selecting at least one RVID pair for the breaking.

7. The method of claim 1, comprising further repeating the breaking, determining, appending, and repeating for all RVIDs in the schedule of visits.

8. A system of optimizing scheduling and dispatching of a plurality of riders/vehicles to visit a plurality of destinations, the system comprising:
a non-transitory computer-readable memory medium configured to store a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring; and
one or more processors configured to perform a plurality of operations including:
break the schedule data structure into a first part and a second part, the first part including only visits associated with a particular one of the RVID parameters, the second part including only visits not associated with the particular one of the RVID parameters,
determine a modified first part, the modified first part being modified according to a permutation of unique days/week of the first part,
append the modified first part with the second part to provide a modified schedule data structure,
repeat the break, determine, and append operations for each of the RVID parameters to provide a plurality of modified schedule data structures, the plurality including the modified schedule data structure,
determine from the plurality of modified schedule data structures a mirroring-improved schedule data structure, and
provide the mirroring-improved schedule data structure to control dispatch of the plurality of riders/vehicles.

9. The system of claim 8, comprising the one or more processors being configured to determine the mirroring-improved schedule data by calculating a mirror parameter (MP) for each of the plurality of modified schedule data structures and identifying one of the plurality of modified schedule data structures with an optimized MP.

10. The system of claim 8, wherein the schedule being optimized for one or more parameters includes the schedule being optimized for total rider/vehicle travel distance.

11. The system of claim 10, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

12. The system of claim 8, wherein the one or more processors are configured to, prior to the breaking, group the schedule data structure based on the RVID parameters and selecting at least one RVID for the breaking.

13. The system of claim 8, wherein the one or more processors are configured to, prior to the breaking, group RVID pairs in the schedule data structure according to at least one location overlap criterion and selecting at least one RVID pair for the breaking.

14. The system of claim 8, wherein the one or more processors are configured to repeat for all RVIDs in the schedule of visits the operations:
break the schedule data structure into the first part and the second part,
determine the modified first part,
append the modified first part with the second part to provide the modified schedule data structure, and
repeat the break, determine and append operations for each of the RVID parameters.

15. An apparatus for optimizing scheduling and dispatching of a plurality of riders/vehicles to visit a plurality of destinations, the apparatus comprising:
a non-transitory computer-readable memory medium configured with instructions executable by one or more processors to process a schedule data structure including a schedule of visits to the plurality of destinations over a plurality of weeks, the visits being associated with respective rider/vehicle identification (RVID) parameters each corresponding to one of the plurality of riders/vehicles, the schedule of visits being optimized for one or more parameters but non-optimized for mirroring by performing the acts of:
breaking the schedule data structure into a first part and a second part, the first part including only visits associated with a particular one of the RVID parameters, the second part including only visits not associated with the particular one of the RVID parameters,
determining a modified first part, the modified first part being modified according to a permutation of unique days/week of the first part,
appending the modified first part with the second part to provide a modified schedule data structure,
repeating the acts of breaking, determining and appending for each of the RVID parameters to provide a plurality of modified schedule data structures, the plurality including the modified schedule data structure,
determining from the plurality of modified schedule data structures a mirroring-improved schedule data structure, and
providing the mirroring-improved schedule data structure to control dispatch of the plurality of riders/vehicles.

16. The apparatus of claim 15, wherein the determining the mirroring-improved schedule data includes calculating a mirror parameter (MP) for each of the plurality of modified schedule data structures and identifying one of the plurality of modified schedule data structures with an optimized MP.

17. The apparatus of claim 15, wherein the schedule being optimized for one or more parameters includes the schedule being optimized for total rider/vehicle travel distance.

18. The apparatus of claim 17, wherein the schedule being optimized for one or more parameters includes the schedule being optimized for one or more of: maximum rider/vehicle capacity, minimum rider/vehicle capacity, allocation of all tasks of a plurality of tasks to some rider/vehicle, balancing of task count across a plurality of riders/vehicles, and minimum overlapping geographies between riders/vehicles.

19. The apparatus of claim 15, wherein the instructions are executable by the one or more processors to, prior to the act of breaking, perform the act of grouping the schedule data structure based on the RVID parameters and selecting at least one RVID for the breaking.

20. The apparatus of claim 15, wherein the instructions are executable by the one or more processors to, prior to the breaking, perform the act of grouping RVID pairs in the schedule data structure according to at least one location overlap criterion and selecting at least one RVID pair for the breaking.

21. The apparatus of claim 15, wherein the instructions are executable by the one or more processors to perform the act of further repeating the breaking, determining, appending, and repeating for all RVIDs in the schedule of visits.

* * * * *